(12) United States Patent
Tanigawa et al.

(10) Patent No.: US 12,189,633 B2
(45) Date of Patent: Jan. 7, 2025

(54) COMPUTER SYSTEM AND SEARCH METHOD FOR ENVIRONMENT

(71) Applicant: Hitachi, Ltd., Tokyo (JP)

(72) Inventors: Keiko Tanigawa, Tokyo (JP); Yohsuke Ishii, Tokyo (JP); Yuya Isoda, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 1 day.

(21) Appl. No.: 18/118,876

(22) Filed: Mar. 8, 2023

(65) Prior Publication Data

US 2023/0418826 A1    Dec. 28, 2023

(30) Foreign Application Priority Data

Jun. 28, 2022  (JP) .................... 2022-103487

(51) Int. Cl.
  *G06F 16/24*    (2019.01)
  *G06F 16/2455*  (2019.01)

(52) U.S. Cl.
  CPC .............. *G06F 16/24565* (2019.01)

(58) Field of Classification Search
  None
  See application file for complete search history.

(56) References Cited

U.S. PATENT DOCUMENTS

| | | | |
|---|---|---|---|
| 2016/0210328 A1* | 7/2016 | Bendel | G06F 16/24544 |
| 2018/0365429 A1* | 12/2018 | Segal | H04L 67/535 |
| 2019/0080287 A1 | 3/2019 | Kotake et al. | |
| 2023/0168880 A1* | 6/2023 | Verma | G06F 11/3612 |
| | | | 717/172 |

FOREIGN PATENT DOCUMENTS

| | | |
|---|---|---|
| JP | 2017-174131 A | 9/2017 |
| JP | 2021-189933 A | 12/2021 |
| WO | WO-2014/024251 A1 | 2/2014 |
| WO | WO-2017/187482 A1 | 11/2017 |

OTHER PUBLICATIONS

Scott Paguette; Identifying the security risks associated with governmental use of cloud computing; Elsevier; pp. 245-253 (Year: 2010).*

* cited by examiner

*Primary Examiner* — Albert M Phillips, III
*Assistant Examiner* — Jermaine A Mincey
(74) *Attorney, Agent, or Firm* — Foley & Lardner LLP

(57) ABSTRACT

A computer system for searching for a candidate for an environment in which an object is to be deployed, the computer system is coupled to a plurality of infrastructure systems each of which provides the environment. The computer system receives a search request including an environmental requirement being a condition required for the environment in which the object is to be deployed and a constraint being a condition to be complied with in deployment of the object; executes first environment search processing for searching for the environment that satisfies the constraint and the environmental requirement; changes the environmental requirement in a case where the environment in which the object is deployable does not exist; and executes second environment search processing for searching for the environment that satisfies the constraint and the changed environmental requirement.

8 Claims, 21 Drawing Sheets

| 401 | 402 | 403 | 404 | 405 | 406 |
|---|---|---|---|---|---|
| APPLICATION ID | APPLICATION NAME | REPOSITORY | VERSION | OWNER | FEE |
| app_1 | WEB SERVER | /aaa.com/.. | 2.4.1 | COMPANY A | Free |
| app_2 | DBMS | /aaa.com/.. | 11.10.1 | COMPANY A | Free |
| app_3 | LOG SEARCH SERVER | /bbb.com/.. | 7.3.1 | COMPANY B | Free |
| ... | ... | ... | ... | ... | ... |
| app_11 | GENOME ANALYSIS | /ccc.com/.. | 1.0.0 | COMPANY C | ¥100k/hour |
| app_12 | ANALYSIS ENGINE | /ccc.com/.. | 2.0.1 | COMPANY C | ¥50k/hour |
| ... | ... | ... | ... | ... | ... |

*FIG. 4A*

| APPLICATION ID (411) | INFRASTRUCTURE SOFTWARE (412) | CPU (413) | MEMORY (414) | STORAGE (415) |
|---|---|---|---|---|
| app_1 | K8s 1.19+ | 1 | 128MB | - |
| app_2 | K8s 1.19+ | 2 | 2GB | 20GB |
| app_3 | K8s 1.19+ | 2 | 4GB | 40GB |
| ⋮ | ⋮ | ⋮ | ⋮ | ⋮ |
| app_11 | CLOUD1_k8s | 32 | 32GB | 500GB |
| app_12 | CLOUD1_k8s | 64 | 64GB | 10TB |
| ⋮ | ⋮ | ⋮ | ⋮ | ⋮ |

FIG. 4B

| APPLICATION ID (421) | USER (422) | PLACE (423) |
|---|---|---|
| app_1 | - | - |
| app_2 | - | - |
| app_3 | - | - |
| ⋮ | ⋮ | ⋮ |
| app_11 | - | JP,US |
| app_12 | EMPLOYEE | JP |
| ⋮ | ⋮ | ⋮ |

FIG. 4C

| | | | | RESOURCES | | | |
|---|---|---|---|---|---|---|---|
| ENVIRONMENT ID 501 | ENVIRONMENT NAME 502 | CLUSTER NAME 503 | INFRASTRUCTURE SOFTWARE 504 | 505 | | | USER 506 |
| | | | | TOTAL NUMBER OF CPUs | NUMBER OF AVAILABLE CPUs | ... | |
| env_1 | CLOUD1_JP | cl_1 | k8s | 128 | 64 | ... | COMPANY X EMPLOYEE |
| env_2 | CLOUD1_US | cl_2 | CLOUD1_k8s | 128 | 80 | ... | CONTRACTOR |
| env_3 | CLOUD1_EU | cl_3 | CLOUD1_k8s | 256 | 128 | ... | CONTRACTOR |
| env_4 | ON-PREMISES | cl_4 | k8s | 256 | 32 | ... | COMPANY X EMPLOYEE |
| env_5 | CLOUD2_JP | cl_5 | k8s | 128 | 32 | ... | COMPANY Y EMPLOYEE |
| ... | ... | ... | ... | ... | ... | ... | ... |

*FIG. 5*

| SETTING ITEM ID | OBJECT ID | SETTING ITEM |
|---|---|---|
| Conf_1 | Ob_1 | CLOUD1<br>k8s |
| Conf_2 | Ob_1 | OSS<br>SERVICE MESH |
| ⋮ | ⋮ | ⋮ |
| Conf_10 | Ob_1 | CLOUD1<br>SERVICE MESH |
| Conf_11 | Ob_2 | NW PORT:1234 |
| ⋮ | ⋮ | ⋮ |

*FIG. 7*

| PATTERN ID 801 | ITEM TYPE 802 | SETTING ITEM (BEFORE CHANGE) 803 | SETTING ITEM (AFTER CHANGE) 804 | COUNT 805 | APPROVER 806 |
|---|---|---|---|---|---|
| P_1 | k8s | CLOUD1 k8s | OSS k8s | 43 | - |
| P_2 | k8s | OSS k8s | CLOUD2 k8s | 36 | - |
| ... | ... | ... | ... | ... | ... |
| P_10 | SERVICE MESH | OSS SERVICE MESH | CLOUD1 SERVICE MESH | 17 | - |
| ... | ... | ... | ... | ... | ... |
| P_20 | NW PORT | - | PORT:100 TEMPORARILY RELEASED | 1 | NW ADMINISTRATOR |

*FIG. 8*

| CANDIDATE ID 1401 | APPLICATION ID 1402 | ENVIRONMENT ID 1403 | KPI ACHIEVEMENT DEGREE 1404 | COST 1405 | SETTING ITEM CHANGE DETAIL 1406 | TOTAL RISK VALUE 1407 |
|---|---|---|---|---|---|---|
| Sug_1 | app_1 | env_1 | 75% | 35 | CHANGE NW | 15 |
| Sug_2 | app_1 | env_3 | 120% | 30 | CHANGE K8s | 10 |
| ... | ... | ... | ... | ... | ... | ... |
| Sug_10 | app_1 | env_18 | 100% | 20 | NW PORT TEMPORARILY RELEASED | 100 |

FIG. 14

COMPUTER SYSTEM AND SEARCH METHOD FOR ENVIRONMENT

CLAIM OF PRIORITY

The present application claims priority from Japanese patent application JP 2022-103487 filed on Jun. 28, 2022, the content of which is hereby incorporated by reference into this application.

BACKGROUND OF THE INVENTION

This invention relates to a technology for placing objects such as an application and software in multi-cloud.

The use of multi-cloud for operating a business system through use of a plurality of cloud services is becoming widespread. As a technology in which an application, data, and the like for implementing a service of a business system are placed in an environment implemented by a cloud system, there is known a technology as described in JP 2017-174131 A.

In JP 2017-174131 A, it is described that "A deployment device 60 includes: a storage unit 61 for storing pieces of deployment destination information each including information indicating a system environment in which a system operates and information indicating a deployment target object that can be deployed in the system environment; and a selection module 62 for selecting a piece of deployment destination information indicating a system environment in which an input deployment target object can be deployed from among the pieces of deployment destination information stored in the storage unit 61."

In this specification, an application, data, and the like to be placed in an environment are each referred to as "object."

SUMMARY OF THE INVENTION

The related art involves presenting an environment that satisfies a requirement (environmental requirement) relating to an environment in which an object is to be placed and a constraint relating to the placement of the object. In the related art, when there is no environment that satisfies both the environmental requirement and the constraint, it is impossible to present the environment in which the object is to be placed.

This invention achieves a system for presenting, when there is no environment that satisfies both an environmental requirement and a constraint, an environment satisfying the environmental requirement as much as possible and satisfying the constraint.

A representative example of the present invention disclosed in this specification is as follows: a computer system for searching for a candidate for an environment in which an object is to be deployed, the computer system comprises at least one computer including a processor, a storage device coupled to the processor, and a network interface coupled to the processor. The computer system is coupled to a plurality of infrastructure systems each of which provides the environment. The at least one computer is configured to: receive a search request including an environmental requirement being a condition required for the environment in which the object is to be deployed and a constraint being a condition to be complied with in deployment of the object; execute first environment search processing for searching for the environment that satisfies the constraint and the environmental requirement; change the environmental requirement in a case where the environment in which the object is deployable does not exist as a result of the first environment search processing; and execute second environment search processing for searching for the environment that satisfies the constraint and the changed environmental requirement.

According to the at least one embodiment of this invention, when there is no cloud system that satisfies both the environmental requirement and the constraint, the computer system can present, as an environment candidate, a cloud system satisfying the environmental requirement as much as possible and satisfying the constraint. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 4A, FIG. 4B, and FIG. 4C are tables for showing examples of pieces of information stored in an application DB in the first embodiment;

FIG. 5 is a table for showing an example of information stored in an infrastructure system DB in the first embodiment;

FIG. 7 is a table for showing an example of information stored in a setting item DB in the first embodiment;

FIG. 8 is a table for showing an example of information stored in a setting item change pattern DB in the first embodiment;

FIG. 14 is a table for showing an example of an environment candidate list output by the environment candidate search system of the first embodiment;

DETAILED DESCRIPTION OF THE PREFERRED EMBODIMENTS

Figure 1:
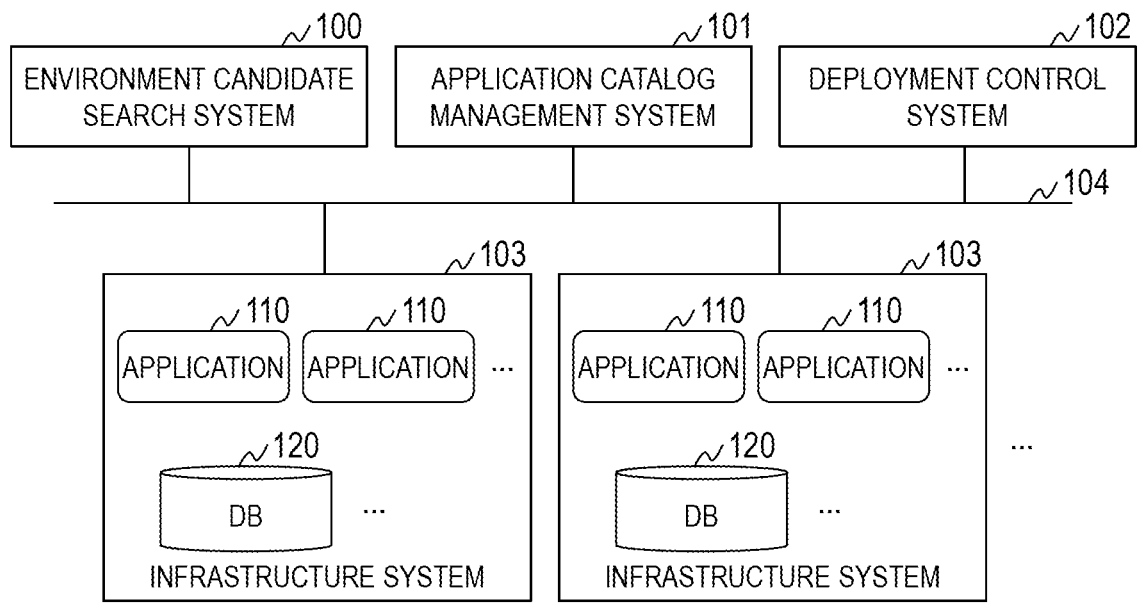
FIG. 1 is a diagram for illustrating an example of a configuration of a system according to a first embodiment.

Now, description is given of at least one embodiment of this invention referring to the drawings. It should be noted that this invention is not to be construed by limiting the invention to the content described in the following at least one embodiment. A person skilled in the art would easily recognize that specific configurations described in the following at least one embodiment may be changed within the scope of the concept and the gist of this invention.

In configurations of the at least one embodiment of this invention described below, the same or similar components or functions are denoted by the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and others in order to facilitate understanding of this invention. Thus, this invention is not limited to the position, size, shape, range, and others disclosed in, for example, the drawings.

First Embodiment

Figure 2:
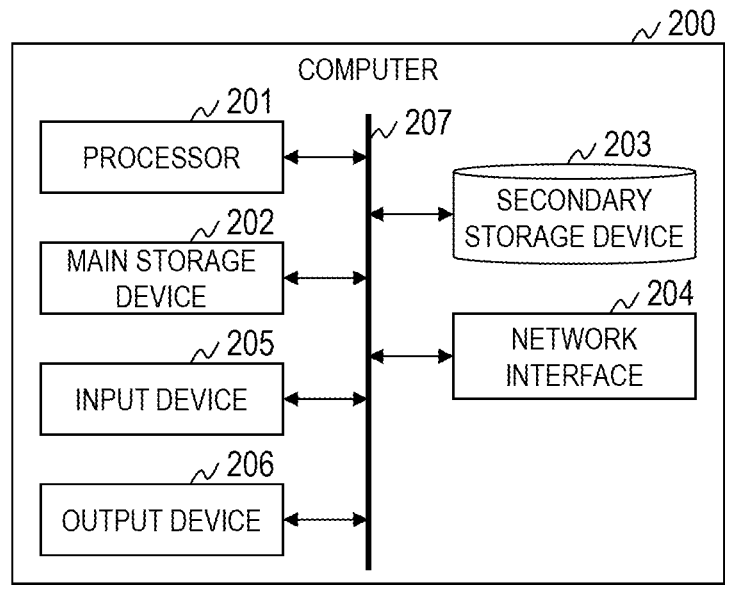
FIG. 2 is a diagram for illustrating an example of a configuration of a computer in the first embodiment.

FIG. 1 is a diagram for illustrating an example of a configuration of a system according to a first embodiment of this invention. FIG. 2 is a diagram for illustrating an example of a configuration of a computer in the first embodiment.

The system according to the first embodiment includes an environment candidate search system 100, an application catalog management system 101, a deployment control system 102, and a plurality of infrastructure systems (cloud systems) 103. The environment candidate search system 100, the application catalog management system 101, the deployment control system 102, and the plurality of infrastructure systems 103 are coupled to each other through a network 104 such as a local area network (LAN) and a wide area network (WAN). A coupling method of the network 104 may be any one of a wired manner or a wireless manner.

The system may include a terminal for inputting various kinds of information and receiving output of various kinds of information.

The infrastructure system 103 is a computer system that provides an environment for executing applications 110. The environment provided by the infrastructure system 103 includes the applications 110 and databases (hereinafter referred to as "DBs") 120.

The application catalog management system 101 manages an application catalog being information regarding the applications 110.

The environment candidate search system 100 searches environments (infrastructure systems 103) in which objects, such as the applications 110 and data, are to be placed based on an environmental requirement and a constraint. In the first embodiment, the application 110 is described as an object to be placed. The data may also be set as an object.

The environmental requirement represents a condition required for an environment in which an object is to be deployed, which includes software and a protocol that are implemented in the environment and a resource amount required for deploying the object. The constraint represents a condition to be complied with in deployment of the object, which includes a placement location of the object and a user of the object.

The deployment control system 102 deploys an object in an environment based on information on environment candidates retrieved by the environment candidate search system 100 and selected by a user.

The environment candidate search system 100, the application catalog management system 101, the deployment control system 102, and the infrastructure system 103 are each formed of such a computer 200 as illustrated in, for example, FIG. 2.

The computer 200 includes a processor 201, a main storage device 202, a secondary storage device 203, a network interface 204, an input device 205, and an output device 206. The respective hardware components are coupled to each other through a bus 207. The input device 205 and the output device 206 may be excluded from the computer 200.

The processor 201 executes programs stored in the main storage device 202. The processor 201 functions as a functional module (module) by executing processing in accordance with the programs. In the following description, when processing is described with the functional module as the subject of the sentence, this indicates that the processor 201 executes a program for implementing the functional module.

The main storage device 202 is a memory, for example, and stores the programs executed by the processor 201 and the information used by the programs. The main storage device 202 also includes a work area to be temporarily used by the program.

The secondary storage device 203 is, for example, a hard disk drive (HDD) or a solid state drive (SSD), and stores a large amount of data permanently. The programs and information stored in the main storage device 202 may be stored in the secondary storage device 203. In this case, the processor 201 reads out programs and information from the secondary storage device 203, and loads the read programs and information onto the main storage device 202.

The network interface 204 communicates to and from other devices via the network. The input device 205 is a keyboard, a mouse, a touch panel, or the like. The output device 206 is a display or the like.

Figure 3:
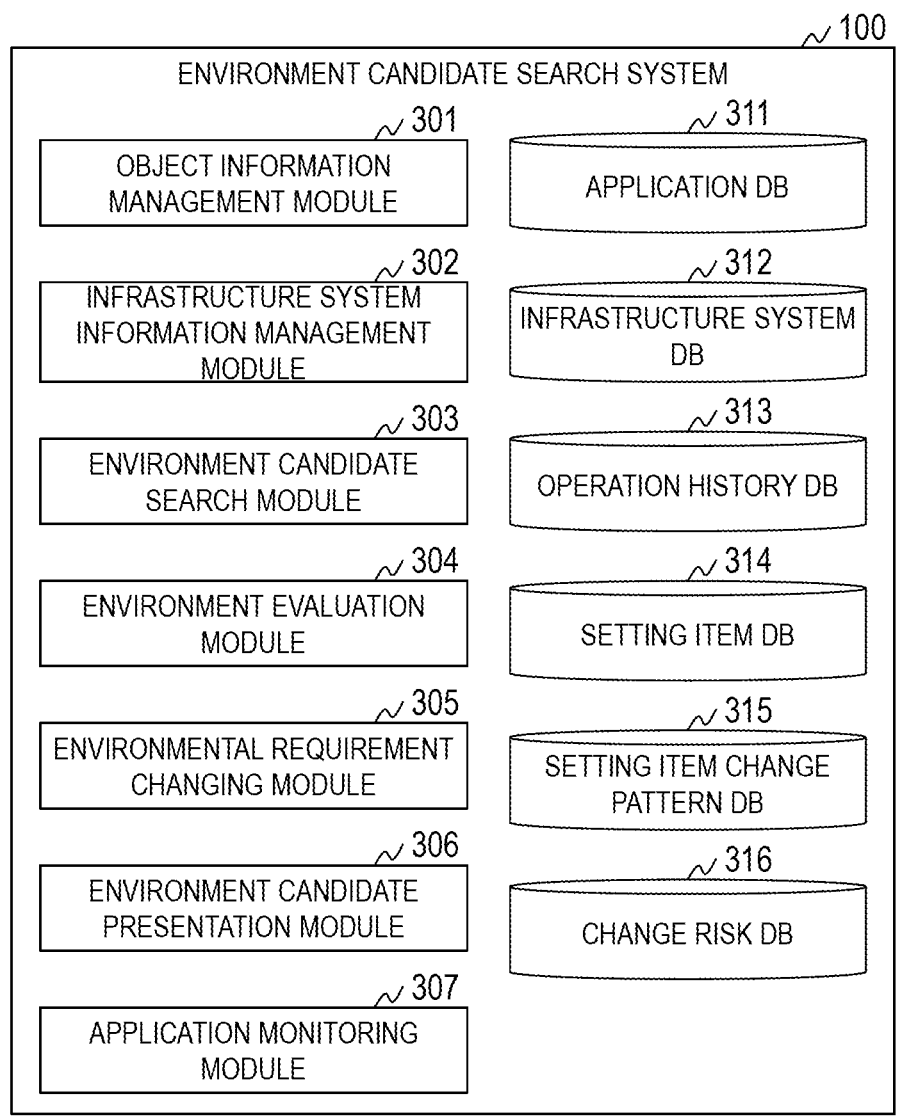
FIG. 3 is a diagram for illustrating an example of a software configuration of an environment candidate search system of the first embodiment.

FIG. 3 is a diagram for illustrating an example of a software configuration of the environment candidate search system 100 of the first embodiment.

The environment candidate search system 100 includes an object information management module 301, an infrastructure system information management module 302, an environment candidate search module 303, an environment evaluation module 304, an environmental requirement changing module 305, an environment candidate presentation module 306, and an application monitoring module 307. The environment candidate search system 100 also holds an application DB 311, an infrastructure system DB 312, an operation history DB 313, a setting item DB 314, a setting item change pattern DB 315, and a change risk DB 316.

The application DB 311 is a database for managing information regarding the applications 110. The infrastructure system DB 312 is a database for managing information regarding the infrastructure systems 103. The operation history DB 313 is a database for managing operation histories of the applications 110 that have been deployed.

The setting item DB 314 is a database for managing setting items that define an environmental requirement. The setting item change pattern DB 315 is a database for managing change patterns for setting items (setting item change patterns). The change risk DB 316 is a database for managing information regarding risks involved in changing the setting item.

The object information management module 301 collects pieces of information on objects, and registers the pieces of information in the application DB 311. The infrastructure system information management module 302 collects pieces of information on the infrastructure systems 103, and registers the pieces of information in the infrastructure system DB 312. The application monitoring module 307 monitors deployment and termination of the application 110, and registers results of the monitoring in the operation history DB 313.

The environment candidate search module 303 searches for an environment (environment candidate) that satisfies the environmental requirement and the constraint. The environment evaluation module 304 evaluates placement of an object in an environment. For example, the environment evaluation module 304 evaluates a processing time period, a cost, and the like involved in the placement of the object in the environment. The environmental requirement changing module 305 changes the environmental requirement based on the setting item change pattern. The environment candidate presentation module 306 presents the retrieved environment candidates.

In regard to the respective functional modules included in the environment candidate search system 100, a plurality of functional modules may be integrated into one functional module, or one functional module may be divided into a plurality of functional modules.

FIG. 4A, FIG. 4B, and FIG. 4C are tables for showing examples of pieces of information stored in the application DB 311 in the first embodiment.

The application DB 311 stores three tables, namely, a table 400 shown in FIG. 4A, a table 410 shown in FIG. 4B, and a table 420 shown in FIG. 4C.

The table 400 of FIG. 4A is information corresponding to a catalog of the applications 110. The application DB 311 stores a plurality of tables 400, and a name (catalog name) is assigned to each of the tables 400.

The table 400 stores an entry including an application ID 401, an application name 402, a repository 403, a version 404, an owner 405, and a fee 406. There is one entry for each application 110. The fields included in the entry are not limited to those described above. Any one of the fields described above may be excluded, or another field may be included.

The application ID 401 is a field for storing an ID of the application 110. The ID of the application 110 stored in the application ID 401 is handled as identification information on the entry. The application name 402 is a field for storing a name of the application 110. The repository 403 is a field for storing information on a repository in which an entity of the application 110 is stored. For example, a link thereto is stored in the repository 403. The version 404 is a field for storing a version of the application 110. The owner 405 is a field for storing an owner of the application 110. The fee 406 is a field for storing a usage fee of the application 110.

The table 410 of FIG. 4B is information for managing requirements relating to software and resources included in the environmental requirement of each application 110. The environmental requirement may include cooperation with another application 110 and a communication method of each application 110.

The table 410 stores an entry including an application ID 411, an infrastructure software 412, a CPU 413, a memory 414, and a storage 415. There is one entry for each application 110. The fields included in the entry are not limited to those described above. Any one of the fields described above may be excluded, or another field may be included.

The application ID 411 is the same field as the application ID 401. The ID of the application 110 stored in the application ID 411 is handled as identification information on the entry. The infrastructure software 412 is a field for storing information on software to be implemented by the environment for deployment. The CPU 413, the memory 414, and the storage 415 are a group of fields for storing resource amounts required for deploying the application 110.

The table 420 of FIG. 4C is information for managing the constraint of each application 110.

The table 420 stores an entry including an application ID 421, a user 422, and a place 423. There is one entry for each application 110. The fields included in the entry are not limited to those described above. Any one of the fields described above may be excluded, or another field may be included.

The application ID 421 is the same field as the application ID 401. The ID of the application 110 stored in the application ID 421 is handled as identification information on the entry. The user 422 is a field for storing information on a user who can use the application 110. The place 423 is a field for storing a place such as a country or region in which there is an environment in which the application 110 can be placed.

FIG. 5 is a table for showing an example of information stored in the infrastructure system DB 312 in the first embodiment.

The infrastructure system DB 312 stores a table 500. The table 500 stores an entry including an environment ID 501, an environment name 502, a cluster name 503, an infrastructure software 504, resources 505, and a user 506. There is one entry for each environment. The fields included in the entry are not limited to those described above. Any one of the fields described above may be excluded, or another field may be included.

The environment ID 501 is a field for storing an ID of an environment. The ID of the environment stored in the environment ID 501 is handled as identification information on the entry. The environment name 502 is a field for storing a name of the environment. The cluster name 503 is a field for storing a name of a cluster that forms the environment.

In the first embodiment, one or more clusters are formed in the infrastructure system 103, and one cluster is used to implement one environment.

The infrastructure software 504 is a field for storing information on software implemented in the environment. The resources 505 are a group of fields for managing resources of the environment. The resources 505 include fields for storing a total number of CPUs, the number of available CPUs, a total amount of memory, the amount of available memory, and the like. The user 506 is a field for storing information on a user who can use the environment.

Figure 6:
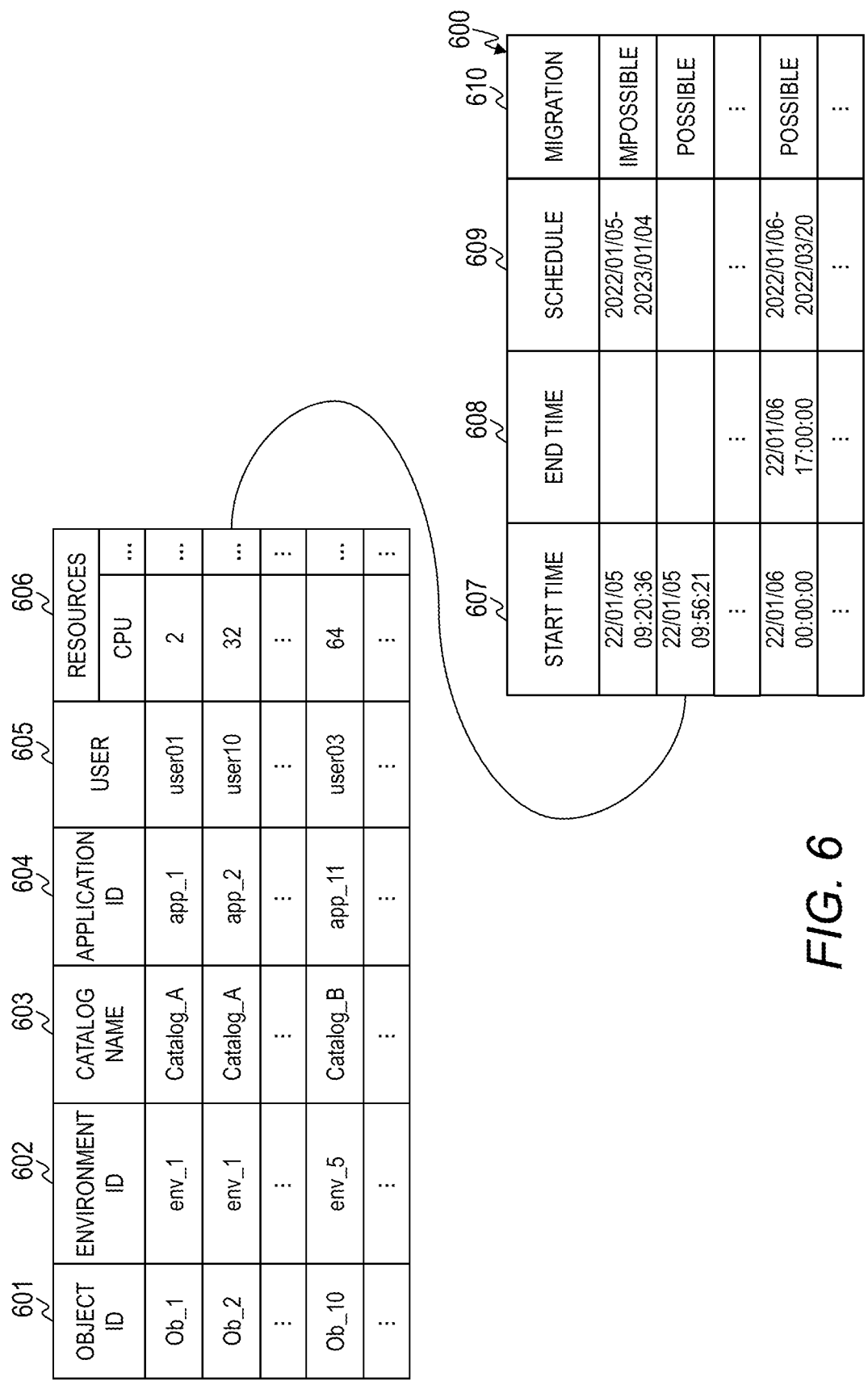
FIG. 6 is a table for showing an example of information stored in an operation history DB in the first embodiment.

FIG. 6 is a table for showing an example of information stored in the operation history DB 313 in the first embodiment.

The operation history DB 313 stores a table 600. The table 600 stores an entry including an object ID 601, an environment ID 602, a catalog name 603, an application ID 604, a user 605, resources 606, a start time 607, an end time 608, a schedule 609, and migration 610. There is one entry for each object. The fields included in the entry are not limited to those described above. Any one of the fields described above may be excluded, or another field may be included.

The object ID 601 is a field for storing an ID of a deployed object. The ID of the object stored in the object ID 601 is handled as identification information on the entry. A plurality of the same applications 110 may be deployed in an environment, and hence the deployed application 110 is identified through use of the object ID.

The environment ID 602 is the same field as the environment ID 501. The catalog name 603 is a field for storing a name of the table 400 that manages the information on the application 110 corresponding to the object. The application ID 604 is a field for storing the ID of the application 110.

The user 605 is a field for storing information regarding a user who uses the object. The resources 606 are a group of fields for storing resource amounts allocated in accordance with the deployment of the object. The resources 606 include a group of fields for storing the number of CPUs, a memory capacity, a storage capacity, and the like.

The start time 607 is a field for storing a time at which the object was deployed in the environment. The end time 608 is a field for storing a time at which the object was deleted from the environment.

The schedule 609 is a field for storing a usage period of the application 110. The migration 610 is a field for storing whether or not an object can be migrated.

FIG. 7 is a table for showing an example of information stored in the setting item DB 314 in the first embodiment.

The setting item DB 314 stores a table 700. The table 700 stores an entry including a setting item ID 701, an object ID 702, and a setting item 703. There is one entry for each set of the application 110 and the setting item. The fields included in the entry are not limited to those described above. Any one of the fields described above may be excluded, or another field may be included.

The setting item ID 701 is a field for storing an ID handled as identification information on the entry. The object ID 702 is a field for storing identification information on an object to be deployed. The setting item 703 is a field for storing a value of the setting item that defines the environmental requirement.

Figure 9:
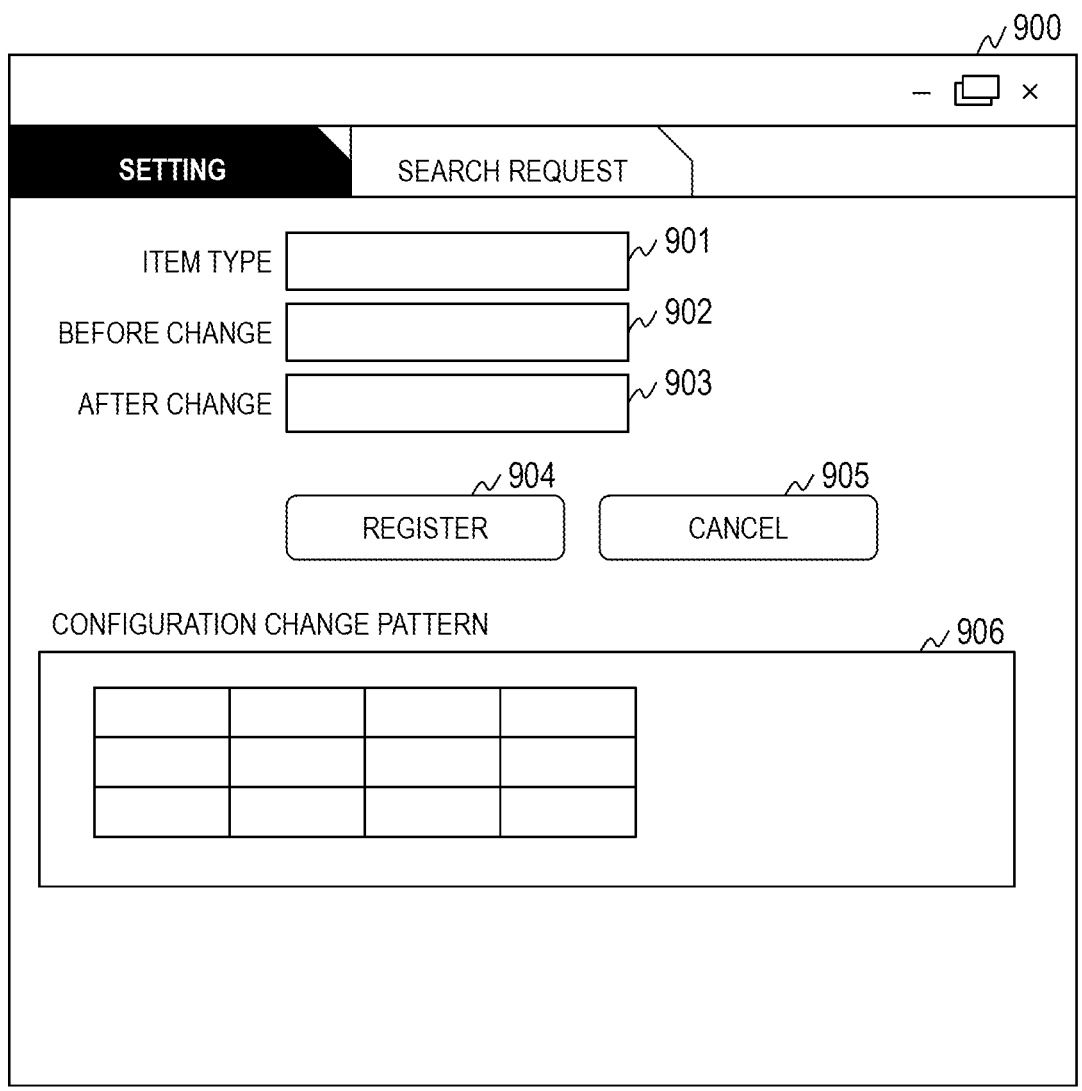
FIG. 9 is a view for illustrating an example of a screen to be presented by the environment candidate search system in the first embodiment.

FIG. 8 is a table for showing an example of information stored in the setting item change pattern DB 315 in the first embodiment. FIG. 9 is a view for illustrating an example of a screen to be presented by the environment candidate search system 100 in the first embodiment.

The setting item change pattern DB 315 stores a table 800. The table 800 stores an entry including a pattern ID 801, an item type 802, a setting item (before change) 803, a setting item (after change) 804, a count 805, and an approver 806. There is one entry for each setting item change pattern. The fields included in the entry are not limited to those described above. Any one of the fields described above may be excluded, or another field may be included.

The pattern ID 801 is a field for storing an ID of a setting item change pattern. The ID stored in the pattern ID 801 is handled as identification information on the entry. The item type 802 is a field for storing a type of setting item. The setting item (before change) 803 is a field for storing a value of the setting item before a change. The setting item (after change) 804 is a field for storing a value of the setting item after the change. The count 805 is a field for storing the number of times that the setting item change pattern has been used. The approver 806 is a field for storing an approver from whom approval is required for applying the setting item change pattern. The approver 806 being blank indicates that no approval is required.

The setting item change pattern is set through use of, for example, such a screen 900 as shown in FIG. 9. The screen 900 includes input fields 901, 902, and 903, operation buttons 904 and 905, and a display field 906.

The input field 901 is a field for inputting an item type. The input field 902 is a field for inputting the value of the setting item before the change. The input field 903 is a field for inputting the value of the setting item after the change.

The operation button 904 is an operation button for registering, in the setting item change pattern DB 315, an entry including the values input in the input fields 901, 902, and 903. The operation button 905 is an operation button for canceling the registration of the entry in the setting item change pattern DB 315.

The display field 906 is a field for displaying entries registered in the setting item change pattern DB 315. The display field 906 may display all entries registered in the setting item change pattern DB 315, or may display only entries registered by the user.

Figure 10A:
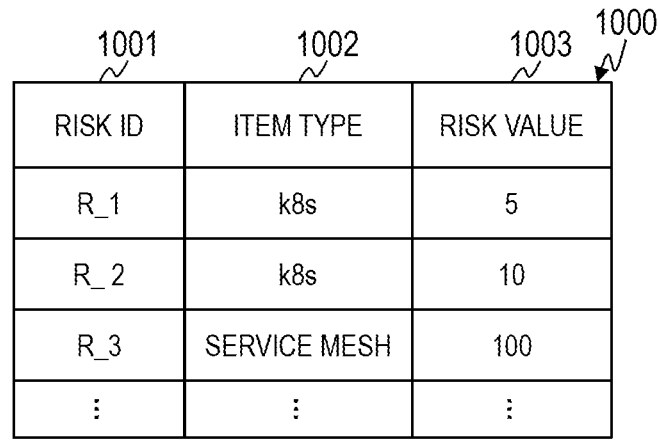
FIG. 10A and FIG. 10B are tables for showing examples of information stored in a change risk DB in the first embodiment.
Figure 10B:
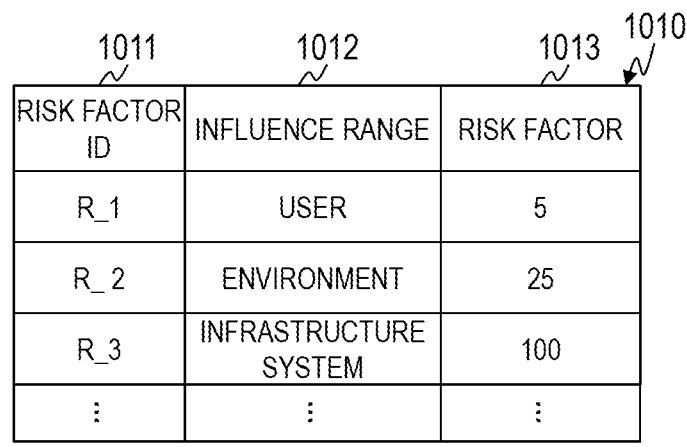

FIG. 10A and FIG. 10B are tables for showing examples of information stored in the change risk DB 316 in the first embodiment.

The change risk DB 316 stores two tables, namely, a table 1000 shown in FIG. 10A and a table 1010 shown in FIG. 10B.

The table 1000 of FIG. 10A is information for managing a risk value indicating a magnitude of a risk of a change corresponding to a setting item change pattern. The table 1000 stores an entry including a risk ID 1001, an item type 1002, and a risk value 1003. There is one entry for each type of setting item. The fields included in the entry are not limited to those described above. Any one of the fields described above may be excluded, or another field may be included.

The risk ID 1001 is a field for storing an ID handled as identification information on the entry. The item type 1002 is a field for storing the type of setting item. The risk value 1003 is a field for storing the risk value indicating the magnitude of the risk of a change in the setting item classified under the item type 1002.

The table 1010 of FIG. 10B is information for managing a risk factor indicating a range of an influence of the change corresponding to the setting item change pattern and a magnitude of the influence. The table 1010 stores an entry including a risk factor ID 1011, an influence range 1012, and a risk factor 1013. There is one entry for each influence range. The fields included in the entry are not limited to those described above. Any one of the fields described above may be excluded, or another field may be included.

The risk factor ID 1011 is a field for storing an ID handled as identification information on the entry. The influence range 1012 is a field for storing a range of an influence caused by the change corresponding to the setting item change pattern. The risk factor 1013 is a field for storing the risk factor.

Figure 11:
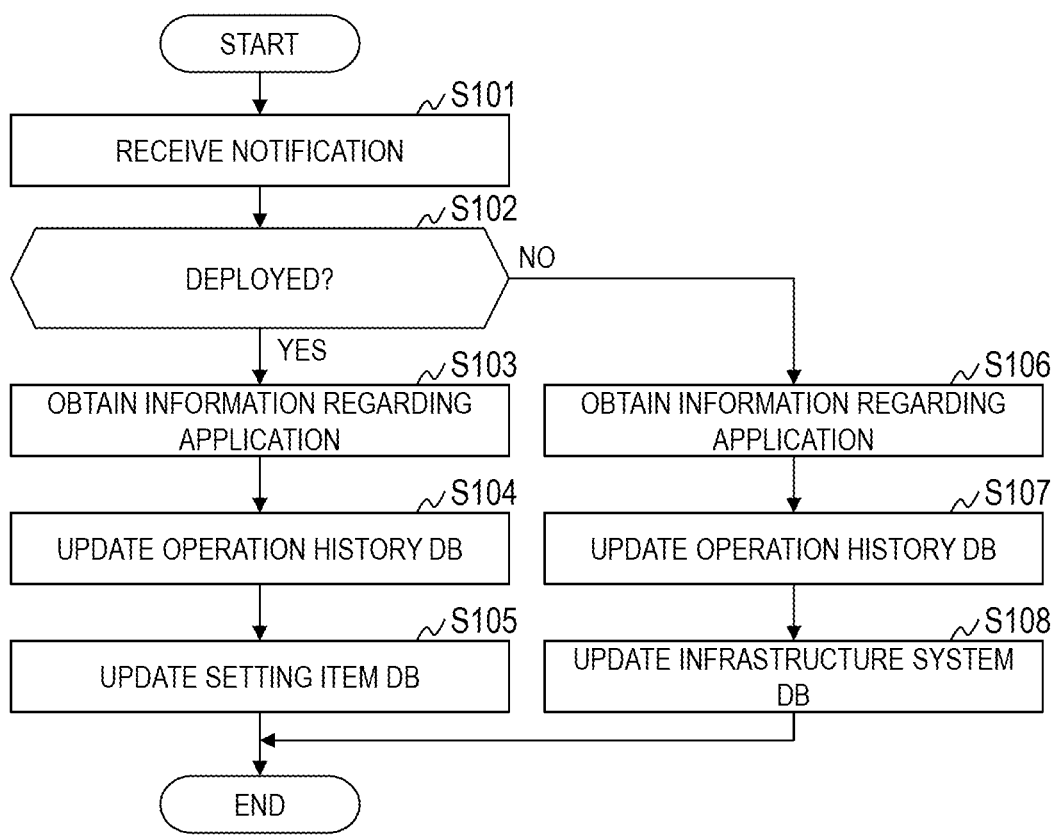
FIG. 11 is a flow chart for illustrating an example of application information update processing to be executed by the environment candidate search system of the first embodiment.

FIG. 11 is a flow chart for illustrating an example of application information update processing to be executed by the environment candidate search system 100 of the first embodiment.

The environment candidate search system 100 monitors deployment and termination of the application 110, and when any one of the deployment or termination of the application 110 is detected, executes processing described below.

As a method of monitoring the deployment of the application 110, a method of receiving a notification of the deployment from the deployment control system 102 is conceivable. The notification includes the ID of an object, the name of a catalog, and the ID of the application 110. Meanwhile, as a method of monitoring the termination of the application 110, a method of receiving a notification of the termination from the infrastructure system 103 is conceivable. The notification includes the ID of an object. This invention is not limited by the method of monitoring the deployment and termination of the application 110.

In a case where the application monitoring module 307 receives a notification from any one of the deployment control system 102 or the infrastructure system 103 (Step S101), the application monitoring module 307 determines whether or not the notification is a notification regarding the deployment of the application 110 (Step S102).

In a case where the received notification is a notification regarding the deployment of the application 110 (YES in Step S102), the application monitoring module 307 obtains information regarding the deployed application 110 (Step S103). For example, the application monitoring module 307 obtains the information regarding the application 110 from an environment in which this application 110 has been deployed.

The application monitoring module 307 updates the operation history DB 313 based on the information regarding the deployed application 110 (Step S104).

Specifically, the application monitoring module 307 adds an entry to the operation history DB 313, and sets an ID in the object ID 601 of the added entry. The application monitoring module 307 sets values in the environment ID 602, the catalog name 603, the application ID 604, the user 605, the resources 606, the schedule 609, and the migration 610 of the added entry based on the information regarding the deployed application 110. The application monitoring module 307 also sets the current time in the start time 607 of the added entry. The start time 607 may be set to a time at which the deployment control system 102 deployed the application 110.

The application monitoring module 307 updates the setting item DB 314 based on the information regarding the deployed application 110 (Step S105), and ends the application information update processing.

Specifically, the application monitoring module 307 extracts the environmental requirement from the information regarding the deployed application 110. The application monitoring module 307 adds an entry to the setting item DB 314 for each setting item of the extracted environmental requirement.

In a case where it is determined in Step S102 that the received notification is a notification regarding the termination of the application 110 (NO in Step S102), the application monitoring module 307 obtains information regarding the terminated application 110 (Step S106). For example, the application monitoring module 307 obtains the information regarding the application 110 from an environment in which this application 110 has been deployed.

The application monitoring module 307 updates the operation history DB 313 based on the information regarding the deployed application 110 (Step S107).

Specifically, the application monitoring module 307 refers to the operation history DB 313 to retrieve an entry in which the ID of the object included in the notification is set in the object ID 601. The application monitoring module 307 sets the current time in the end time 608 of the retrieved entry. The end time 608 may be set to a time at which the application 110 was stopped in the environment.

The application monitoring module 307 updates the infrastructure system DB 312 (Step S108), and ends the application information update processing.

Specifically, the application monitoring module 307 obtains the information regarding the resources from the environment in which the terminated application 110 was deployed. The application monitoring module 307 refers to the infrastructure system DB 312 to update the resources 505 of the entry corresponding to the environment.

Figure 12:
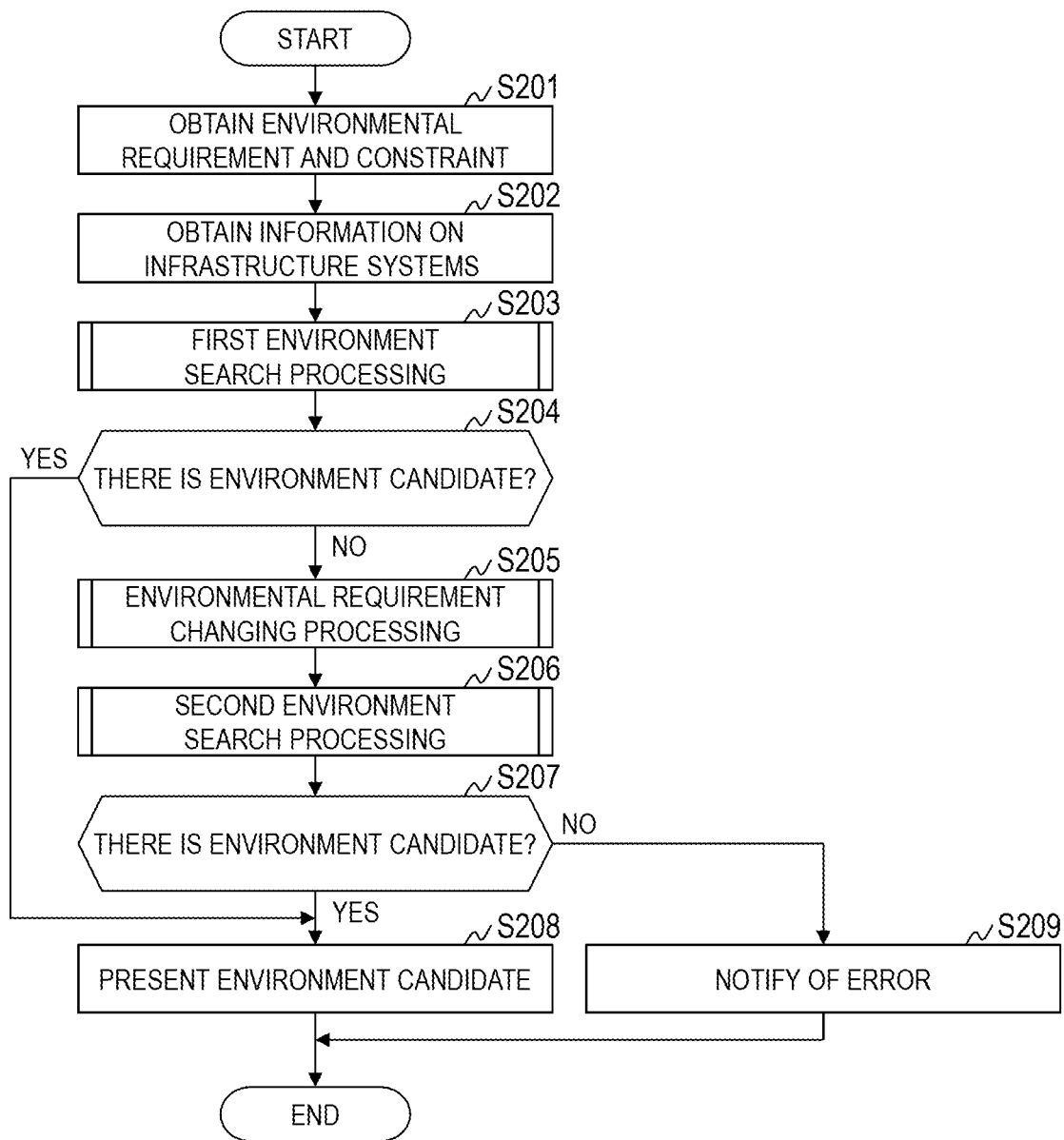
FIG. 12 is a flow chart for illustrating an example of environment candidate search processing to be executed by the environment candidate search system of the first embodiment.
Figure 13:
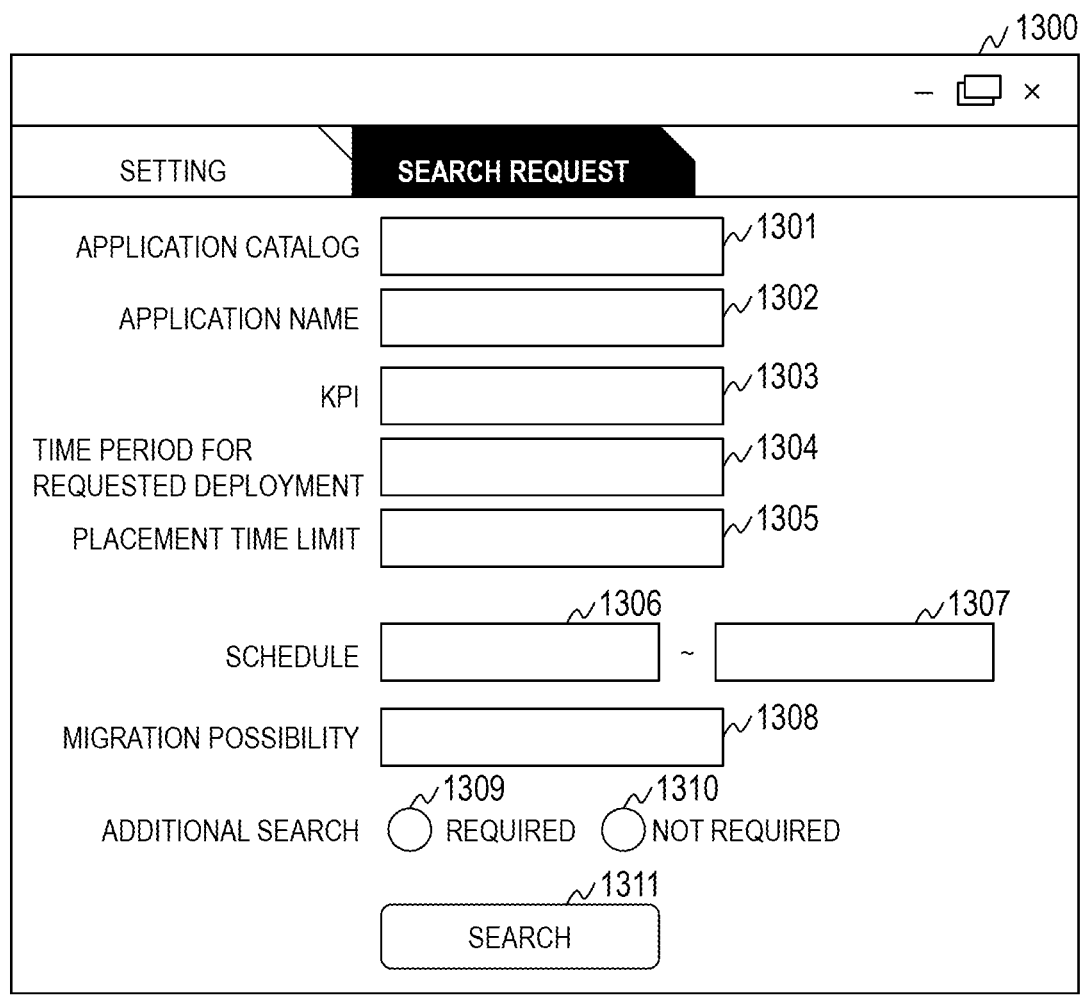
FIG. 13 is a view for illustrating an example of a screen to be presented by the environment candidate search system of the first embodiment.
Figure 15:
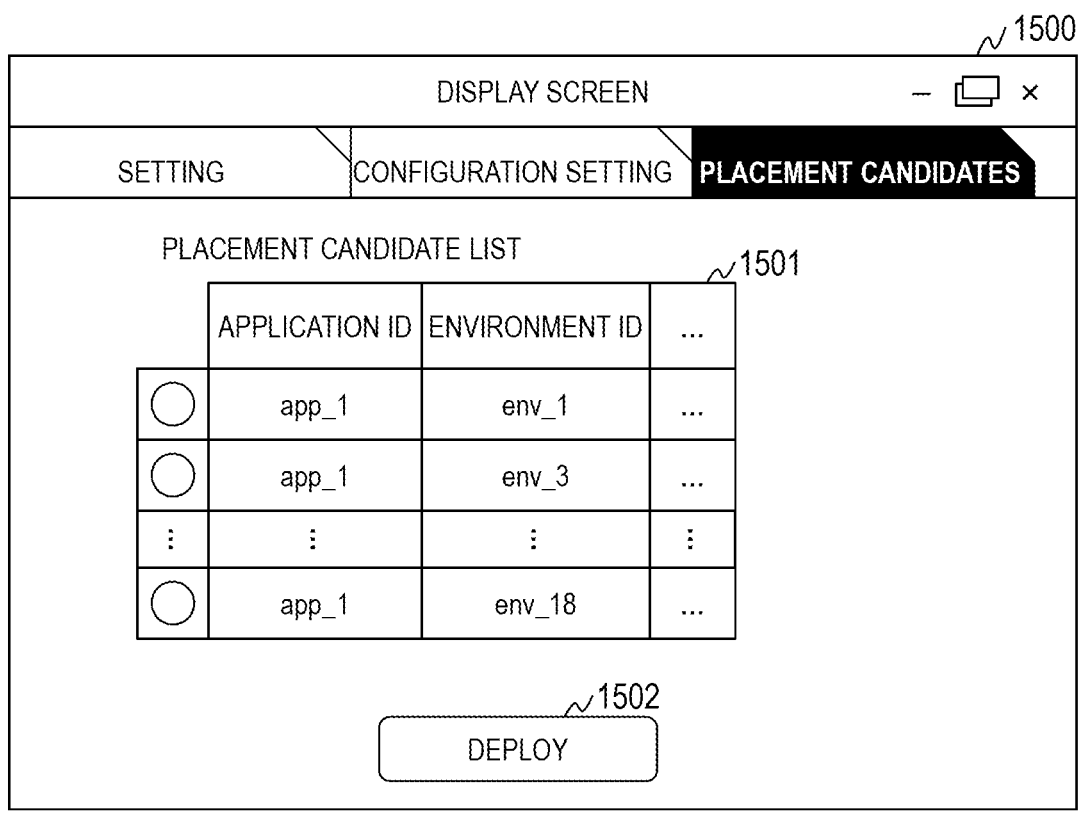
FIG. 15 is a view for illustrating an example of a screen to be presented by the environment candidate search system of the first embodiment.

FIG. 12 is a flow chart for illustrating an example of environment candidate search processing to be executed by the environment candidate search system 100 of the first embodiment. FIG. 13 is a view for illustrating an example of a screen to be presented by the environment candidate search system 100 of the first embodiment. FIG. 14 is a table for showing an example of an environment candidate list output by the environment candidate search system 100 of the first embodiment. FIG. 15 is a view for illustrating an example of a screen to be presented by the environment candidate search system 100 of the first embodiment.

The environment candidate search system 100 presents a screen 1300 to a user who wishes to deploy the application 110. The screen 1300 includes input fields 1301, 1302, 1303, 1304, 1305, 1306, 1307, and 1308, radio buttons 1309 and 1310, and an operation button 1311.

The input field 1301 and the input field 1302 are fields for inputting values for designating the application 110 to be deployed. A field for inputting the version may be provided. The input field 1303 is a field for inputting a key performance indicator (KPI). For example, "cost," "performance," and "power consumption" are displayed in the input field 1303 in a pull-down format. The input field 1304 is a field for inputting a time period required for deployment requested by the user. The input field 1305 is a field for inputting a time limit for the deployment of the application 110.

The input field 1306 and the input field 1307 are fields for inputting dates and times for designating the usage period of the application 110. The input field 1308 is a field for inputting whether or not the application 110 can be migrated.

The radio button 1309 and the radio button 1310 are radio buttons for controlling whether or not to execute an additional search when there is no environment that satisfies the environmental requirement and constraint. The radio button 1309 is operated to permit the execution of an additional search, and the radio button 1310 is operated to not permit the execution of an additional search.

In the first embodiment, the environment candidate search processing to be performed when the execution of an additional search is permitted is described.

The operation button 1311 is an operation button for instructing to execute the environment candidate search processing. In a case where the user presses the operation button 1311, a search request including various values input on the screen 1300 is transmitted to the environment candidate search system 100.

The environment candidate search module 303 refers to the tables 400, 410, and 420 based on the information on the application 110 included in an execution request to obtain the environmental requirement and the constraint (Step S201). The execution request may include the information regarding the environmental requirement and the constraint.

The environment candidate search module 303 obtains pieces of information on the respective infrastructure systems 103 from the infrastructure system DB 312 (Step S202).

The environment candidate search module 303 executes, based on the pieces of information on the infrastructure systems 103, first environment search processing for searching for an environment that satisfies the constraint and the environmental requirement (Step S203). Details of the first environment search processing are described with reference to FIG. 16.

The environment candidate search module 303 determines based on a result of the first environment search processing whether or not there is an environment (environment candidate) in which the application 110 can be placed (Step S204).

In a case where there is an environment candidate (YES in Step S204), the environment candidate search module 303 presents the environment candidate (Step S208), and ends the environment candidate search processing.

In a case where there is no environment candidate (NO in Step S204), the environment candidate search module 303 instructs the environmental requirement changing module 305 to execute environmental requirement changing processing (Step S205). In the environmental requirement changing processing, the environmental requirement is changed. Details of the environmental requirement changing processing are described with reference to FIG. 17.

The environment candidate search module 303 executes, based on the pieces of information on the infrastructure systems 103, second environment search processing for searching for an environment that satisfies the constraint and the changed environmental requirement (Step S206). Details of the second environment search processing are described with reference to FIG. 18A and FIG. 18B.

In a case where environment candidates are retrieved by the second environment search processing, such an environment candidate list 1400 as shown in FIG. 14 is output.

The environment candidate list 1400 stores an entry including a candidate ID 1401, an application ID 1402, an environment ID 1403, a KPI achievement degree 1404, a cost 1405, a setting item change detail 1406, and a total risk value 1407. There is one entry for each environment candidate. The fields included in the entry are not limited to those described above. Any one of the fields described above may be excluded, or another field may be included.

The candidate ID 1401 is a field for storing an ID of an entry. The application ID 1402 is a field for storing the ID of the application 110 to be deployed. The environment ID 1403 is a field for storing an ID of an environment candidate.

The KPI achievement degree 1404 is a field for storing a degree to which the KPI has been achieved. In the first embodiment, a ratio of an actual deployment time period to the requested deployment time period is used as the degree of KPI achievement. The cost 1405 is a field for storing a cost required for usage of the deployed application 110.

The setting item change detail 1406 is a field for storing details of the changed setting item. The total risk value 1407 is a field for storing a risk value involved in changing the setting item.

The environment candidate search module 303 determines based on a result of the second environment search processing whether or not there is an environment (environment candidate) in which the application 110 can be placed (Step S207).

In a case where there is an environment candidate (YES in Step S207), the environment candidate search module 303 presents the environment candidate (Step S208), and ends the environment candidate search processing.

For example, the environment candidate search module 303 causes the environment candidate presentation module 306 to present such a screen 1500 as illustrated in FIG. 15. The screen 1500 includes a list 1501 and an operation button 1502.

The list 1501 is a list of retrieved environment candidates. The list 1501 is displayed based on the environment candidate list 1400. The user refers to the list 1501 to press a radio button for any one of the environment candidates. The operation button 1502 is an operation button for instructing to deploy the application 110 in the selected environment candidate. In a case where the operation button 1502 is pressed, the environment candidate search module 303 transmits a deployment request including information on the selected environment candidate and application 110 to the deployment control system 102.

In a case where there is no environment candidate (NO in Step S207), the environment candidate search module 303 notifies the user of an error (Step S209), and ends the environment candidate search processing. For example, the user is notified that there is no environment candidate.

In a case where the execution of an additional search is not permitted and the determination results in "NO" in Step S204, the environment candidate search module 303 advances the process to Step S209.

Figure 16:
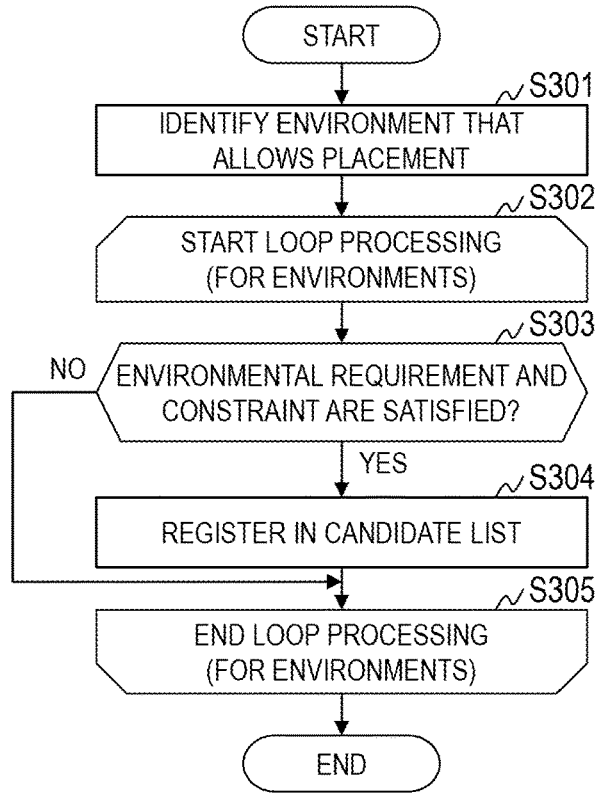
FIG. 16 is a flow chart for illustrating an example of first environment search processing to be executed by the environment candidate search system of the first embodiment.

FIG. 16 is a flow chart for illustrating an example of the first environment search processing to be executed by the environment candidate search system 100 of the first embodiment.

The environment candidate search module 303 refers to the infrastructure system DB 312 to identify environments in which infrastructure software required for the application 110 is installed and resource amounts required for the application 110 can be provided (Step S301).

The environment candidate search module 303 starts loop processing for the identified environments (Step S302). The environment candidate search module 303 selects one environment from among the identified environments.

The environment candidate search module 303 determines whether or not the selected environment satisfies the environmental requirement and constraint (Step S303).

In a case where the selected environment does not satisfy the environmental requirement and the constraint (NO in Step S303), the environment candidate search module 303 advances the process to Step S305.

In a case where the selected environment satisfies the environmental requirement and the constraint (YES in Step S303), the environment candidate search module 303 registers the selected environment in the environment candidate list 1400 (Step S304), and then advances the process to Step S305. At this time, the environment candidate search module 303 instructs the environment evaluation module 304 to calculate the degree of KPI achievement and the cost. The setting item change detail 1406 and the total risk value 1407 of an entry added to the environment candidate list 1400 are blank.

In Step S305, the environment candidate search module 303 determines whether or not the processing has been completed for all the identified environments (Step S305).

In a case where the processing has not been completed for all the identified environments, the environment candidate search module 303 returns the process to Step S302.

In a case where the processing has been completed for all the identified environments, the environment candidate search module 303 ends the first environment search processing. The environment candidate search module 303 may, for example, sort or curtail the retrieved environment candidates based on the KPI designated by the user.

Figure 17:
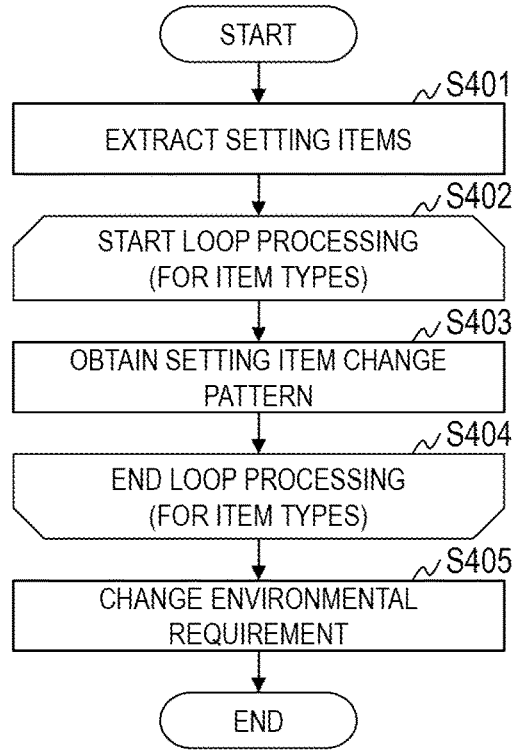
FIG. 17 is a flow chart for illustrating an example of environmental requirement changing processing to be executed by the environment candidate search system of the first embodiment.

FIG. 17 is a flow chart for illustrating an example of the environmental requirement changing processing to be executed by the environment candidate search system 100 of the first embodiment.

The environmental requirement changing module 305 extracts setting items relating to the application 110 to be deployed based on the environmental requirement (Step S401). At this time, the environmental requirement changing module 305 identifies the types of setting items based on the extracted setting items.

The environmental requirement changing module 305 starts loop processing for the types of setting items (Step S402). The environmental requirement changing module 305 selects one type of setting item from among the identified type of setting item.

The environmental requirement changing module 305 refers to the setting item change pattern DB 315 to obtain a setting item change pattern corresponding to the selected type of setting item (Step S403). Specifically, the environmental requirement changing module 305 obtains an entry in which the selected type of setting item is stored in the item type 802 and the same value as the value included in the current environment item is stored in the setting item (before change) 803.

The environmental requirement changing module 305 determines whether or not the processing has been completed for all the identified types of setting items (Step S404).

In a case where the processing has not been completed for all the identified types of setting items, the environmental requirement changing module 305 returns the process to Step S402.

In a case where the processing has been completed for all the identified types of setting items, the environmental requirement changing module 305 uses the obtained setting item change patterns to change the environmental requirement (Step S405), and then ends the environmental requirement changing processing. The environmental requirement changing module 305 outputs a completion notification including the changed environmental requirement to the environment candidate search module 303.

Specifically, the environmental requirement changing module 305 changes at least one setting item included in the environmental requirement based on the setting item change pattern. It is assumed herein that a plurality of changed environmental requirements are generated. The environmental requirement changing module 305 associates the ID of the used setting item change pattern with each of the changed environmental requirements.

It is assumed that the number of setting items to be changed and the number of environmental requirements to be generated are set in advance. In addition, priorities may be set for the setting items to be changed.

Figure 18A:
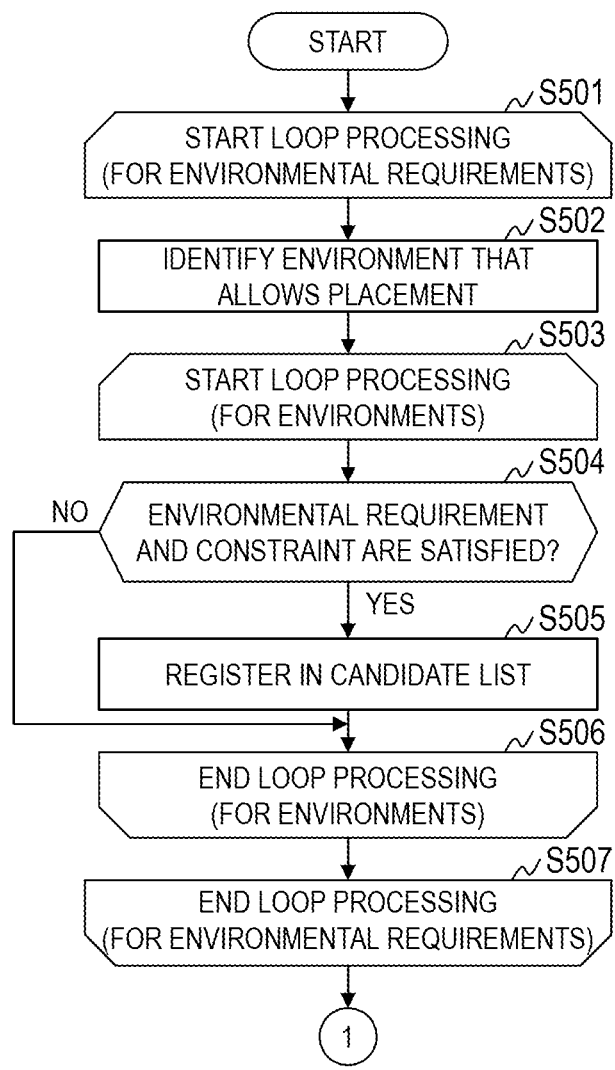
FIG. 18A and FIG. 18B are flow charts for illustrating an example of second environment search processing to be executed by the environment candidate search system of the first embodiment.
Figure 18B:
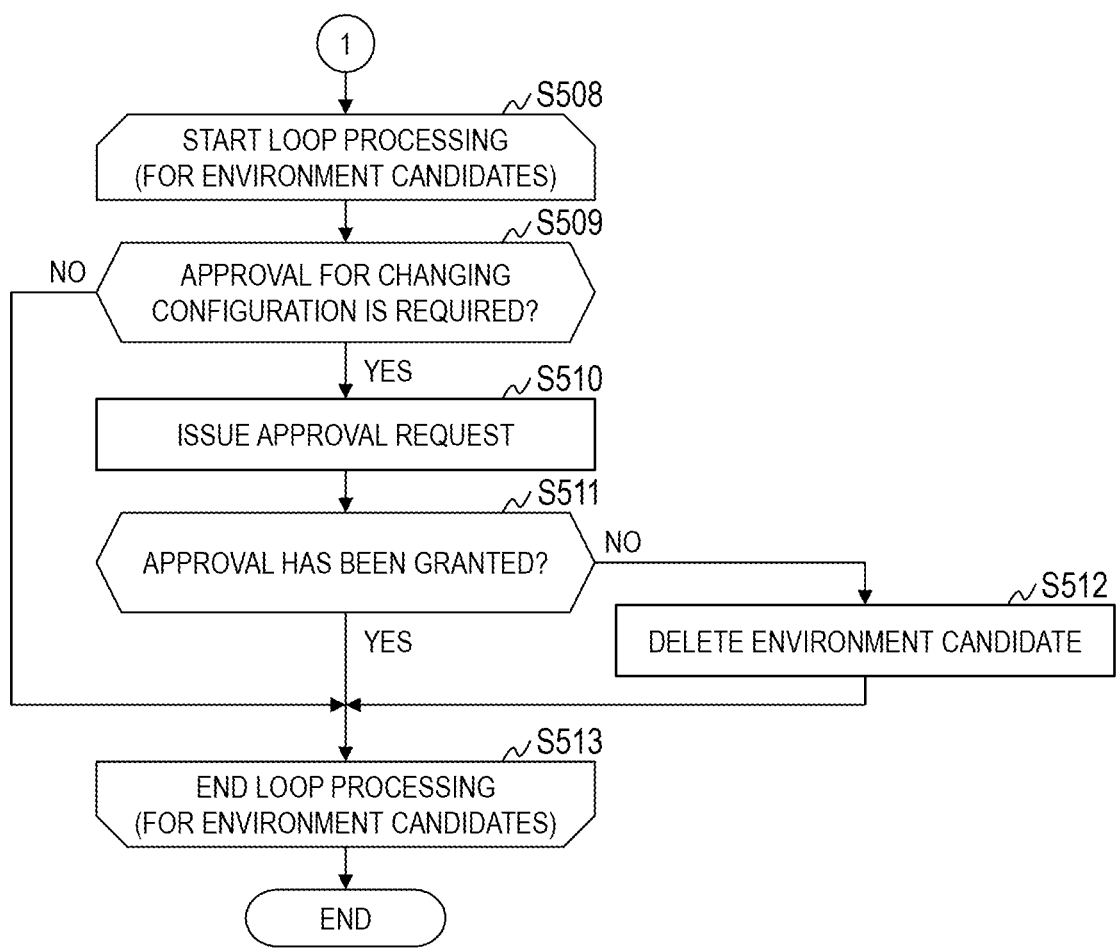

FIG. 18A and FIG. 18B are flow charts for illustrating an example of the second environment search processing to be executed by the environment candidate search system 100 of the first embodiment.

The environment candidate search module 303 starts loop processing for the environmental requirements changed by the environmental requirement changing module 305 (Step S501). The environment candidate search module 303 selects one environmental requirement from among the plurality of changed environmental requirements.

The environment candidate search module 303 refers to the infrastructure system DB 312 to identify an environment in which infrastructure software required for the application 110 is installed and resource amounts required for the application 110 can be provided (Step S502). The processing step of Step S502 is the same as the processing step of Step S301.

The environment candidate search module 303 starts loop processing for the identified environments (Step S503). The environment candidate search module 303 selects one environment from among the identified environments.

The environment candidate search module 303 determines whether or not the selected environment satisfies the environmental requirement and constraint (Step S504).

In a case where the selected environment does not satisfy the environmental requirement and the constraint (NO in Step S504), the environment candidate search module 303 advances the process to Step S506.

In a case where the selected environment satisfies the environmental requirement and the constraint (YES in Step S504), the environment candidate search module 303 registers the selected environment in the environment candidate list 1400 (Step S505), and then advances the process to Step S506.

At this time, the environment candidate search module 303 sets details of the changed environmental requirement in the setting item change detail 1406 of the entry, and sets a total risk value in the total risk value 1407.

The total risk value is calculated in the following manner. The environment candidate search module 303 identifies the changed setting item and an influence range caused by the change in the setting item based on the details of the changed environmental requirement. The environment candidate search module 303 obtains, from the table 1000, the value of the risk value 1003 of the entry corresponding to the type of the changed setting item. The environment candidate search module 303 also obtains, from the table 1010, the value of the risk factor 1013 of the entry corresponding to the identified influence range. The environment candidate search module 303 calculates, for each changed setting item, a value obtained by multiplying the risk value by the risk factor. The environment candidate search module 303 calculates, as the total risk value, a total sum of the values calculated for each of the changed setting items.

In Step S506, the environment candidate search module 303 determines whether or not the processing has been completed for all the identified environments (Step S506).

In a case where the processing has not been completed for all the identified environments, the environment candidate search module 303 returns the process to Step S503.

In a case where the processing has been completed for all the identified environments, the environment candidate search module 303 determines whether or not the processing has been completed for all the changed environmental requirements (Step S507).

In a case where the processing has not been completed for all the changed environmental requirements, the environment candidate search module 303 returns the process to Step S501.

In a case where the processing has been completed for all the changed environmental requirements, the environment candidate search module 303 starts loop processing for the environment candidates (Step S508). The environment candidate search module 303 selects one entry from the environment candidate list 1400.

The environment candidate search module 303 determines whether or not approval involved in changing the setting item is required (Step S509).

The environment candidate search module 303 determines whether or not a value is set in the approver 806 for the setting item change pattern associated with the selected entry. In a case where a value is set in the approver 806 of the setting item change pattern, the environment candidate search module 303 determines that approval involved in changing the setting item is required.

In a case where the approval involved in changing the setting item is not required (NO in Step S509), the environment candidate search module 303 advances the process to Step S513.

In a case where the approval involved in changing the setting item is required (YES in Step S509), the environment candidate search module 303 issues an approval request to the user (Step S510). The environment candidate search module 303 maintains a waiting state until input by the user is obtained.

In a case where input by the user is obtained, the environment candidate search module 303 determines whether or not the approval has been granted (Step S511).

In a case where the approval has been granted (YES in Step S511), the environment candidate search module 303 advances the process to Step S513.

In a case where the approval has not been granted (NO in Step S511), the environment candidate search module 303 deletes the selected environment candidate from the environment candidate list 1400 (Step S512), and then advances the process to Step S513.

In Step S513, the environment candidate search module 303 determines whether or not the processing has been completed for all the environment candidates (Step S513).

In a case where the processing has not been completed for all the environment candidates, the environment candidate search module 303 returns the process to Step S508.

In a case where the processing has been completed for all the environment candidates, the environment candidate search module 303 ends the second environment search processing.

The first embodiment has been described by taking the application 110 as an example of the object to be placed, but this invention is not limited by the object to be placed.

In a case where the application 110 is formed of a plurality of tasks, the environment candidate search system 100 searches an environment for each of objects for implementing a task, and registers a combination of environments for the respective objects in the environment candidate list 1400.

As described above, according to the first embodiment, when there is no environment candidate that satisfies the constraint and the environmental requirement, the environment candidate search system 100 changes the environmental requirement within a range in which the application 110 operates. The environment candidate search system 100 can also retrieve and present environment candidates based on the constraint and the changed environmental requirement.

The details of the changed environmental requirement are presented together with results of retrieving the environment candidates, thereby being capable of improving convenience of the user.

Second Embodiment

A second embodiment of this invention differs from the first embodiment in partial steps of the environment candidate search processing. The second embodiment is described below with a focus on differences from the first embodiment.

A configuration of a system of the second embodiment is the same as that of the first embodiment. A configuration of the environment candidate search system 100 of the second embodiment is the same as that of the first embodiment.

Figure 19:
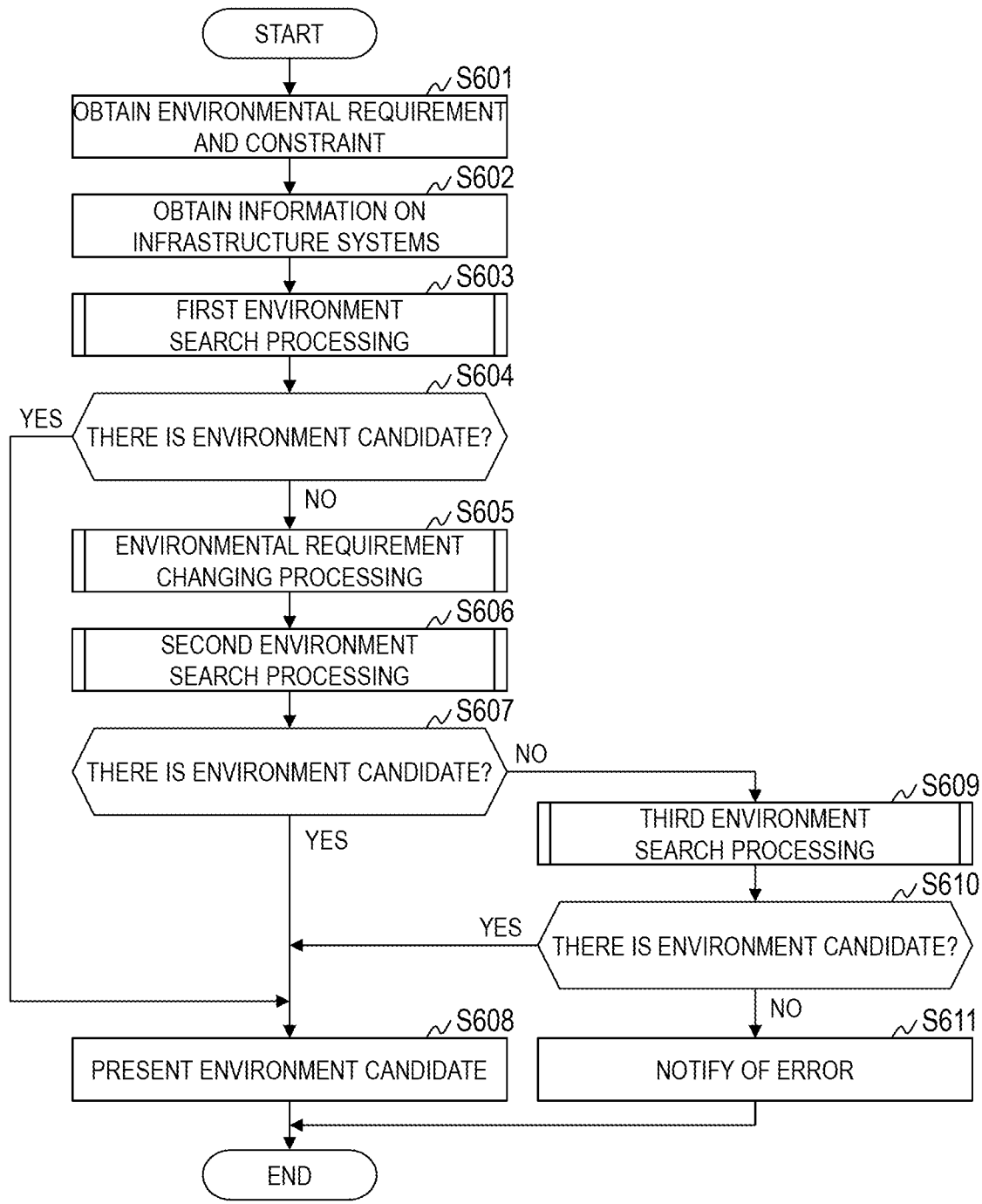
FIG. 19 is a flow chart for illustrating an example of the environment candidate search processing to be executed by the environment candidate search system of a second embodiment.

FIG. 19 is a flow chart for illustrating an example of the environment candidate search processing to be executed by the environment candidate search system 100 of the second embodiment.

The processing steps of from Step S601 to Step S606, Step S608, and Step S611 are the same as the processing steps of from Step S201 to Step S206, Step S208, and Step S209, respectively.

In a case where it is determined in Step S607 that there is no environment candidate (NO in Step S607), the environment candidate search module 303 executes third environment search processing (Step S609).

The environment candidate search module 303 determines based on a result of the third environment search processing whether or not there is an environment (environment candidate) in which the application 110 can be placed (Step S610).

In a case where there is an environment candidate (YES in Step S610), the environment candidate search module 303 presents the environment candidate (Step S608), and ends the environment candidate search processing.

In a case where there is no environment candidate (NO in Step S610), the environment candidate search module 303 notifies the user of an error (Step S611), and ends the environment candidate search processing.

Figure 20:
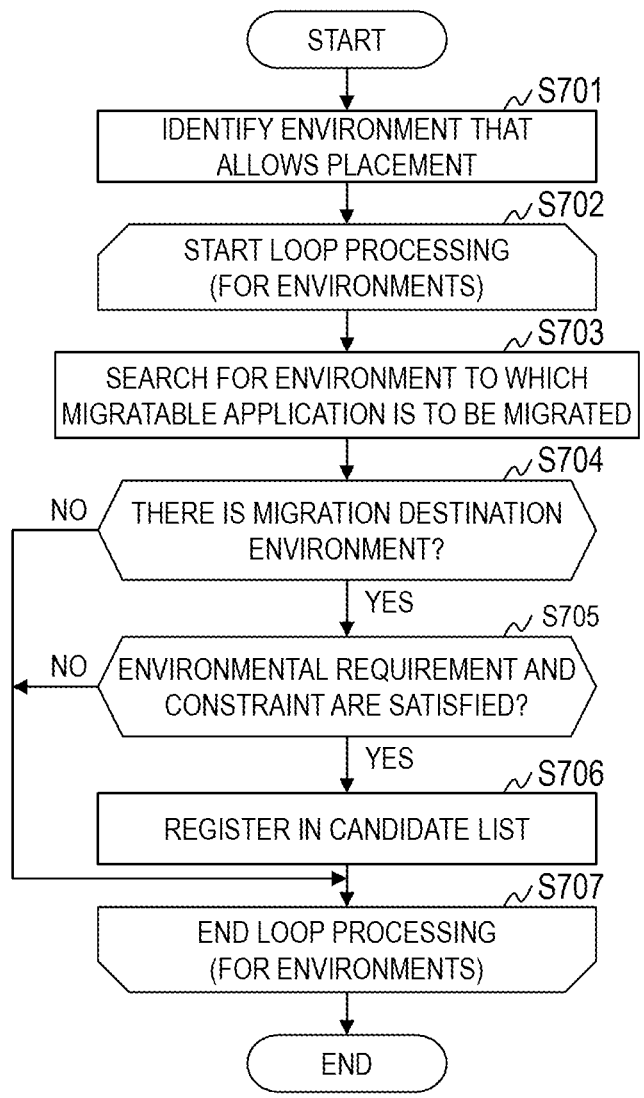
FIG. 20 is a flow chart for illustrating an example of third environment search processing to be executed by the environment candidate search system of the second embodiment.

FIG. 20 is a flow chart for illustrating an example of the third environment search processing to be executed by the environment candidate search system 100 of the second embodiment.

The environment candidate search module 303 refers to the infrastructure system DB 312 to identify an environment in which infrastructure software required for the application 110 is installed (Step S701). In this case, the resource amounts are not taken into consideration.

The environment candidate search module 303 starts loop processing for the identified environments (Step S702). The environment candidate search module 303 selects one environment from among the identified environments.

The environment candidate search module 303 refers to the operation history DB 313 to search for an environment to which the application 110 (migratable application 110) operating in the selected environment and being capable of migration is to be migrated (Step S703).

Specifically, the environment candidate search module 303 executes the first environment search processing on the migratable application 110. Thus, it is possible to search for an environment to which the migratable application 110 is to be migrated. The migratable application 110 can be identified based on the migration 610 of the operation history DB 313.

The environment candidate search module 303 determines whether or not there is an environment to which the migratable application 110 is to be migrated (Step S704).

In a case where there is no environment to which the migratable application 110 is to be migrated (NO in Step S704), the environment candidate search module 303 advances the process to Step S707.

In a case where there is an environment to which the migratable application 110 is to be migrated (YES in Step S704), the environment candidate search module 303 determines whether or not the environment from which the migratable application 110 has been migrated satisfies the environmental requirement and the constraint (Step S705).

In a case where the environment from which the migratable application 110 has been migrated does not satisfy the environmental requirement and the constraint (NO in Step S705), the environment candidate search module 303 advances the process to Step S707.

In a case where the environment from which the migratable application 110 has been migrated satisfies the environmental requirement and the constraint (YES in Step S705), the environment candidate search module 303 registers the selected environment in the environment candidate list 1400 (Step S706), and then advances the process to Step S707.

In Step S707, the environment candidate search module 303 determines whether or not the processing has been completed for all the identified environments (Step S707).

In a case where the processing has not been completed for all the identified environments, the environment candidate search module 303 returns the process to Step S702.

In a case where the processing has been completed for all the identified environments, the environment candidate search module 303 ends the third environment search processing.

According to the second embodiment, the number of environments that are ready for deployment can be increased through migration of the application 110 that has already been deployed.

Third Embodiment

A third embodiment of this invention differs from the first embodiment in partial steps of the environment candidate search processing. The third embodiment is described below with a focus on differences from the first embodiment.

A configuration of a system of the third embodiment is the same as that of the first embodiment. A configuration of the environment candidate search system 100 of the third embodiment is the same as that of the first embodiment.

In the third embodiment, the same environment candidate search processing as that in the second embodiment is executed. However, the third embodiment differs from the second embodiment in partial steps of the third environment search processing.

Figure 21:
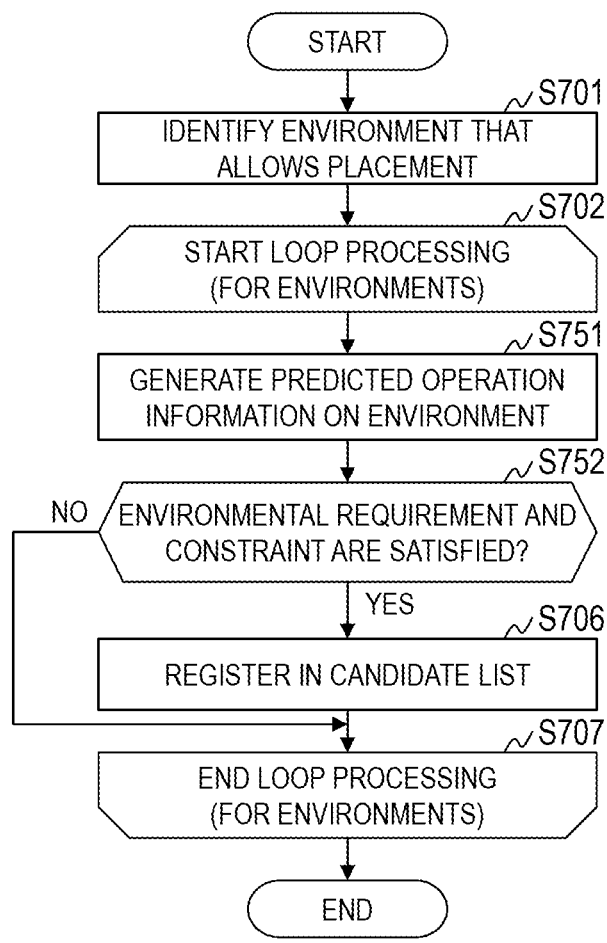
FIG. 21 is a flow chart for illustrating an example of the third environment search processing to be executed by the environment candidate search system of a third embodiment.

FIG. 21 is a flow chart for illustrating an example of the third environment search processing to be executed by the environment candidate search system 100 of the third embodiment.

The processing steps of Step S701 and Step S702 in the third embodiment are the same as those in the second embodiment. Further, the processing steps of Step S706 and Step S707 in the third embodiment are the same as those in the second embodiment.

The environment candidate search module 303 refers to the operation history DB 313 to generate predicted operation information on the selected environment (Step S751).

Specifically, the environment candidate search module 303 obtains the usage period and placement time limit of the application 110 to be deployed. The environment candidate search module 303 calculates a time that is earlier than a start time of the usage period by the placement time limit. For this calculation, a value obtained by adding an offset to the placement time limit may be used. The environment candidate search module 303 identifies the application 110 operating in the environment at the calculated time based on the usage periods of the applications 110 in the selected environment, and also calculates a free resource amount of the environment. The environment candidate search module 303 outputs results of the above-mentioned processing as the predicted operation information.

The environment candidate search module 303 determines based on the predicted operation information whether or not the environment is to satisfy the environmental requirement and the constraint after a lapse of a predetermined time period from the current time (Step S752).

In a case where the environment is not to satisfy the environmental requirement and the constraint after a lapse of a predetermined time period from the current time (NO in Step S752), the environment candidate search module 303 advances the process to Step S707. In a case where the environment is to satisfy the environmental requirement and the constraint after a lapse of a predetermined time period from the current time (YES in Step S752), the environment candidate search module 303 advances the process to Step S706.

According to the third embodiment, even when there is no environment candidate at the current time point, it is possible to present an environment candidate that becomes ready for deployment before the usage start of the application 110.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system for searching for a candidate for an environment in which an object is to be deployed, the computer system comprising at least one computer including a processor, a storage device coupled to the processor, and a network interface coupled to the processor,
   the computer system being coupled to a plurality of infrastructure systems each of which provides the environment,
   the at least one computer being configured to:
   receive, via an input device of the at least one computer, a search request including an environmental requirement being a condition required for the environment in which the object is to be deployed and a constraint being a condition to be complied with in deployment of the object;
   execute, via the processor, first environment search processing for searching for the environment that satisfies the constraint and the environmental requirement;
   change, via the processor, first the environmental requirement in a case where the environment in which the object is deployable does not exist as a result of the first environment search processing;
   execute, via the processor, second environment search processing for searching for the environment that satisfies the constraint and the changed environmental requirement, wherein the environmental requirement includes values of a plurality of types of setting items;
   hold, in the storage device, setting item change pattern information for changing the plurality of types of setting items;
   change, via the processor, based on the setting item change pattern information, a value of the setting item included in the received environmental requirement;
   hold, in the storage device, change risk information for evaluating risks involved in changing the plurality of types of setting items;
   calculate, via the processor, based on the change risk information, a risk value indicating a magnitude of a risk involved in changing a value of the setting item included in the received environmental requirement; and
   present, via an output device of the at least one computer, the environment retrieved by the second environment search processing and the risk value.

2. The computer system according to claim 1, wherein the at least one computer is configured to search, in a case where approval for changing a value of the setting item included in the received environmental requirement is required in the second environment search processing, for the environment that satisfies the constraint and the changed environmental requirement for which the approval has been granted.

3. The computer system according to claim 1, wherein the at least one computer is configured to execute, in a case where the environment in which the object is deployable does not exist as a result of the second environment search processing, third environment search processing for searching for the environment that is to satisfy the environmental requirement and the constraint in a case in which the object that is migratable is migrated.

4. The computer system according to claim 1, wherein the at least one computer is configured to:
   predict operation states of a plurality of the environments at a time that is earlier than a usage start time of the object by a predetermined time period in a case where the environment in which the object is deployable does not exist as a result of the second environment search processing; and
   execute third environment search processing for searching for the environment that satisfies the environmental requirement and the constraint based on results of the prediction.

5. A search method for an environment in which an object is to be deployed, which is executed by a computer system,
   the computer system including at least one computer including a processor, a storage device coupled to the processor, and a network interface coupled to the processor,
   the computer system being coupled to a plurality of infrastructure systems each of which provides the environment,
   the search method for an environment including:
   a first step of receiving, by an input device of the at least one computer, a search request including an environmental requirement being a condition required for the environment in which the object is to be deployed and a constraint being a condition to be complied with in deployment of the object;
   a second step of searching, by the processor of the at least one computer, for the environment that satisfies the constraint and the environmental requirement;
   a third step of changing, by the processor of the at least one computer, the environmental requirement in a case where the environment in which the object is deployable does not exist;
   a fourth step of searching, by the processor of the at least one computer, for the environment that satisfies the constraint and the changed environmental requirement, wherein the environmental requirement includes values of a plurality of types of setting items;
   holding, in the storage device, setting item change pattern information for managing methods of changing the plurality of types of setting items;
   changing, by the processor, based on the setting item change pattern information, a value of the setting item included in the received environmental requirement;
   holding, in the storage device, change risk information for evaluating risks involved in changing the plurality of types of setting items;
   calculating, by the processor, based on the change risk information, a risk value indicating a magnitude of a risk involved in changing a value of the setting item included in the received environmental requirement; and
   presenting, by an output device of the at least one computer, the retrieved environment and the risk value.

6. The search method for an environment according to claim 5, wherein the fourth step includes searching, by the at least one computer, in a case where approval or changing a value of the setting item included in the received environmental requirement is required, for the environment that satisfies the constraint and the changed environmental requirement for which the approval has been granted.

7. The search method for an environment according to claim 5, further including searching, by the at least one computer, in a case where the environment in which the object is deployable does not exist as a result of the execution of the fourth step, for the environment that is to satisfy the environmental requirement and the constraint in a case in which the object that is migratable is deployed.

8. The search method for an environment according to claim 5, further including:
   predicting, by the at least one computer, operation states of a plurality of the environments at a time that is earlier than a usage start time of the object by a predetermined time period in a case where the environment in which the object is deployable does not exist as a result of the execution of the fourth step; and
   searching, by the at least one computer, for the environment that satisfies the environmental requirement and the constraint based on results of the prediction.

* * * * *